(12) United States Patent
Farrell et al.

(10) Patent No.: US 8,761,532 B2
(45) Date of Patent: Jun. 24, 2014

(54) METHOD AND SYSTEM FOR THE SELECTIVE APPLICATION OF AUTOMATIC IMAGE ENHANCEMENT TO DIGITAL IMAGES

(75) Inventors: Michael E. Farrell, Ontario, NY (US); Javier A. Morales, Irondequolt, NY (US); Roger L. Triplett, Penfield, NY (US); David C. Robinson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1491 days.

(21) Appl. No.: 11/708,865

(22) Filed: Feb. 20, 2007

(65) Prior Publication Data

US 2008/0199096 A1 Aug. 21, 2008

(51) Int. Cl.
*G06K 9/40* (2006.01)
(52) U.S. Cl.
USPC .......................................... 382/254; 382/199
(58) Field of Classification Search
USPC .................................................. 382/199, 254
See application file for complete search history.

(56) References Cited

U.S. PATENT DOCUMENTS

| | | | | |
|---|---|---|---|---|
| 5,471,313 A * | 11/1995 | Thieret et al. | 358/296 |
| 5,748,860 A * | 5/1998 | Shively | 358/1.15 |
| 5,835,238 A | 11/1998 | Mantell | 358/458 |
| 5,940,530 A * | 8/1999 | Fukushima et al. | 382/164 |
| 6,023,522 A | 2/2000 | Draganoff et al. | 382/124 |
| 6,201,613 B1 | 3/2001 | Zhang et al. | 358/1.9 |
| 6,480,866 B2 * | 11/2002 | Mastie | 715/255 |
| 6,594,401 B1 * | 7/2003 | Metcalfe et al. | 382/275 |
| 6,633,654 B2 * | 10/2003 | Hannigan et al. | 382/100 |
| 6,748,119 B1 | 6/2004 | Bollman | 382/254 |
| 6,987,535 B1 * | 1/2006 | Matsugu et al. | 348/239 |
| 7,158,174 B2 | 1/2007 | Gindele et al. | 348/224.1 |
| 7,197,161 B2 * | 3/2007 | Fan | 382/100 |
| 7,359,092 B2 * | 4/2008 | Hayashi | 358/3.21 |
| 7,532,738 B2 * | 5/2009 | Hashimoto et al. | 382/100 |
| 7,688,996 B2 * | 3/2010 | Bradley | 382/100 |
| 7,894,673 B2 * | 2/2011 | Takemoto | 382/190 |
| 2002/0051584 A1 * | 5/2002 | Shimizu et al. | 382/311 |
| 2003/0108250 A1 * | 6/2003 | Luo et al. | 382/263 |
| 2004/0169889 A1 * | 9/2004 | Sawada | 358/2.1 |
| 2005/0030568 A1 * | 2/2005 | Narushima et al. | 358/1.9 |
| 2005/0152613 A1 * | 7/2005 | Okutsu et al. | 382/254 |
| 2005/0185820 A1 * | 8/2005 | Yoshida et al. | 382/100 |
| 2006/0087699 A1 * | 4/2006 | Matsuhira | 358/448 |
| 2007/0127771 A1 * | 6/2007 | Kaneda et al. | 382/100 |
| 2007/0292038 A1 * | 12/2007 | Takemoto | 382/240 |
| 2008/0181507 A1 * | 7/2008 | Gope et al. | 382/190 |
| 2009/0091770 A1 * | 4/2009 | Kano et al. | 358/1.1 |
| 2012/0093402 A1 * | 4/2012 | Staelin et al. | 382/165 |
| 2013/0315488 A1 * | 11/2013 | Steinberg et al. | 382/195 |

FOREIGN PATENT DOCUMENTS

JP 2006268142 A * 10/2006
WO WO 2005094058 A1 * 10/2005

* cited by examiner

*Primary Examiner* — Aaron W Carter
(74) *Attorney, Agent, or Firm* — Kermit D. Lopez; Luis M. Ortiz; Kevin Soules (57) ABSTRACT

A method and system for selective application of AIE (Automatic Image Enhancement) based on the characteristic of an image. The image can be evaluated utilizing PDL data, object location data, image layering data, image overprint data and image raster data in combination with a weighting scheme to ascertain whether the image should be designated as a background or watermark. The designated images can be passed through a tag to a DFE (Digital Front End) application in order to determine the application of AIE to the images.

19 Claims, 7 Drawing Sheets

METHOD AND SYSTEM FOR THE SELECTIVE APPLICATION OF AUTOMATIC IMAGE ENHANCEMENT TO DIGITAL IMAGES

TECHNICAL FIELD

Embodiments are generally related to image processing methods and systems. Embodiments are also related to field of image enhancement in digital image processing. Embodiments are additionally related to methods and systems for the selective application of AIE (Automatic Image Enhancement) to digital images.

BACKGROUND OF THE INVENTION

AIE (Automatic Image Enhancement) is a technology that operates on sampled images and invokes image processing operations on the sampled images based on analysis of the images. Automatic image enhancement automatically corrects image deficiencies through adjustments of exposure, contrast, sharpness, color balance and saturation. After analyzing the sampled image, automatic image enhancement techniques automatically determine conservative corrective actions, to perform on the image. A determined and appropriate image processing technique can then be applied to the image. Specifically, automatic image enhancement techniques can be performed in a fully automatic mode, where conservative image processing parameters can be selected to ensure that the image quality does not become worse.

The aim of image enhancement is to improve the interpretability or perception of information in images for human viewers, or to provide better input for other automated image processing techniques. Print applications such as photo books and yearbooks often contain photos (e.g., images) that can benefit from the use of AIE. Subject images often have ancillary images that are utilized to frame the image with a border or provide a thematic background and watermark effect. It is rarely desirable to apply AIE to the ancillary images because AIE will attempt to saturate the color of images that are deliberately unsaturated and light.

Moreover, the actual bits representing the watermark must be scattered throughout the file in such a way that they cannot be identified and manipulated. And finally, the digital watermark must be robust enough so that it can withstand normal changes to the file, such as reductions from lossy compression algorithms. Existing server and freeflow process manager applications do have the ability to apply AIE to all images in a print job; however, such applications do not distinguish between subject images that should be enhanced and ancillary images that should not be enhanced.

Based on the foregoing it is believed that a need exists for an improved technique for the selective application of AIE based on the characteristics of the subject images. Additionally, a need exists for identifying images in a file that should not be acted upon by AIE.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved image processing method and system.

It is another aspect of the present invention to provide for improved image enhancement capabilities in digital image processing applications.

It is a further aspect of the present invention to provide for an improved method and system for selective application of AIE (Automatic Image Enhancement).

The aforementioned aspects and other objectives and advantages can now be achieved as described herein. A method and system for the selective application of AIE based on the characteristics of the images is disclosed. One or more images can be analyzed and evaluated based on one or more characteristics of the images and in combination with a weighting scheme. The image(s) generally corresponds to a "page" of data. One or more background images and one or more watermark images can then be discerned from the subject image after analyzing and evaluating the image(s) based on characteristic(s) of the image in combination with the weighting scheme. Thereafter, an application of an AIE to the background image(s) and the watermark image(s) in order to eliminate the need for a user to manually indicate which images should be subject to an automated image enhancement and thereby lower the operational costs associated with the workflow processing of the image(s).

In general, images on a page can be evaluated using PDL (Page Description Language) data, object location data, image layering data, image overprint data and image raster data in combination with the weighting scheme in order to ascertain whether the subject image is to be designated as a background or watermark. The background and watermark images can be sent to a DFE (Digital Front End) application or mechanism in order to determine the application of AIE to the subject image(s).

The image processing element utilized to implement the embodiments disclosed herein can be implemented as a software pre-processor for an AIE node in the context of a process manager application. The background and watermark designations for the image(s) can be passed, via a tag to another system element such as the DFE application. The DFE application can be responsible for the application or non-application of AIE to the images in a PDL format based on the background and watermark tag. Such method and system can prevent AIE from negatively impacting imaging jobs because AIE does not possess all the data required to perform accurate image processing. Of course, the described tag can also be utilized by a system such as, for example, a process manager. In other words, it is not necessary for the tag or tagging mechanism to occur elsewhere within the system.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally can include instruction media storable within a memory location of an image processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 111 depicted in FIG. 1.

Figure 4:
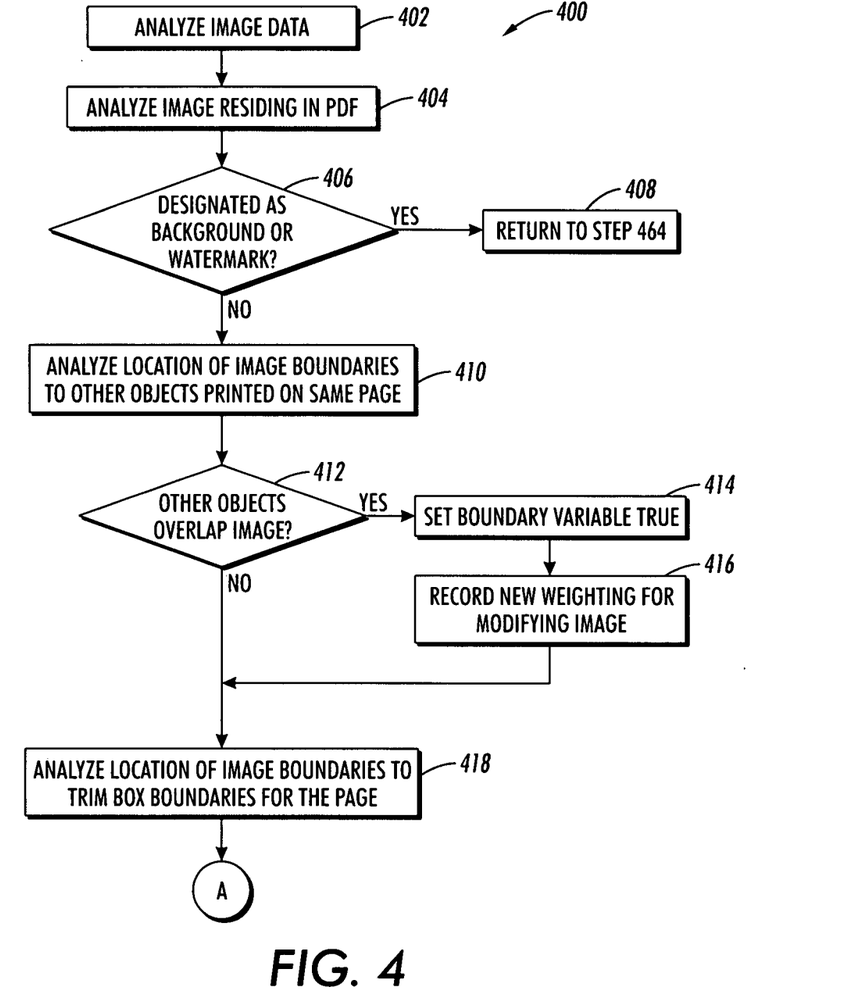
FIGS. 4-7 illustrate detailed flow charts depicting logical operational steps of a method for evaluating images on a page in combination with a weighting scheme for application of AIE, in accordance with a preferred embodiment.
Figure 5:
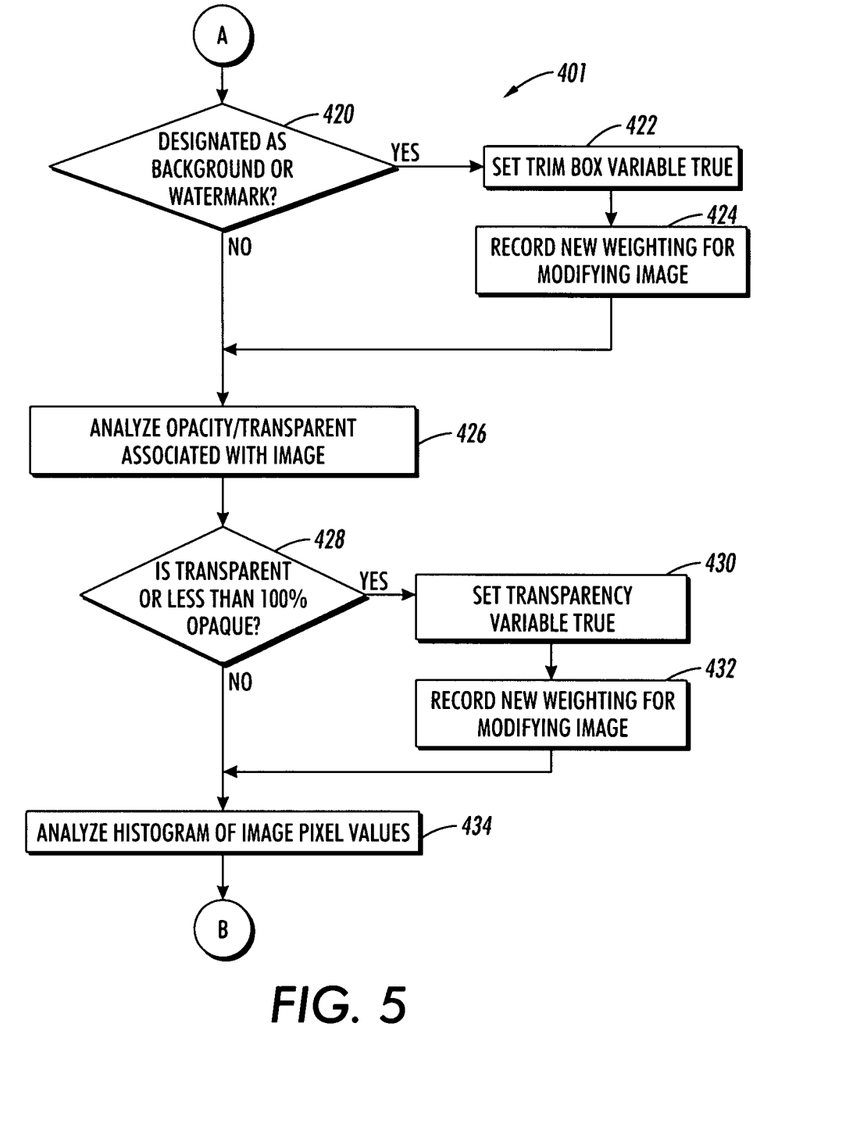
Figure 6:
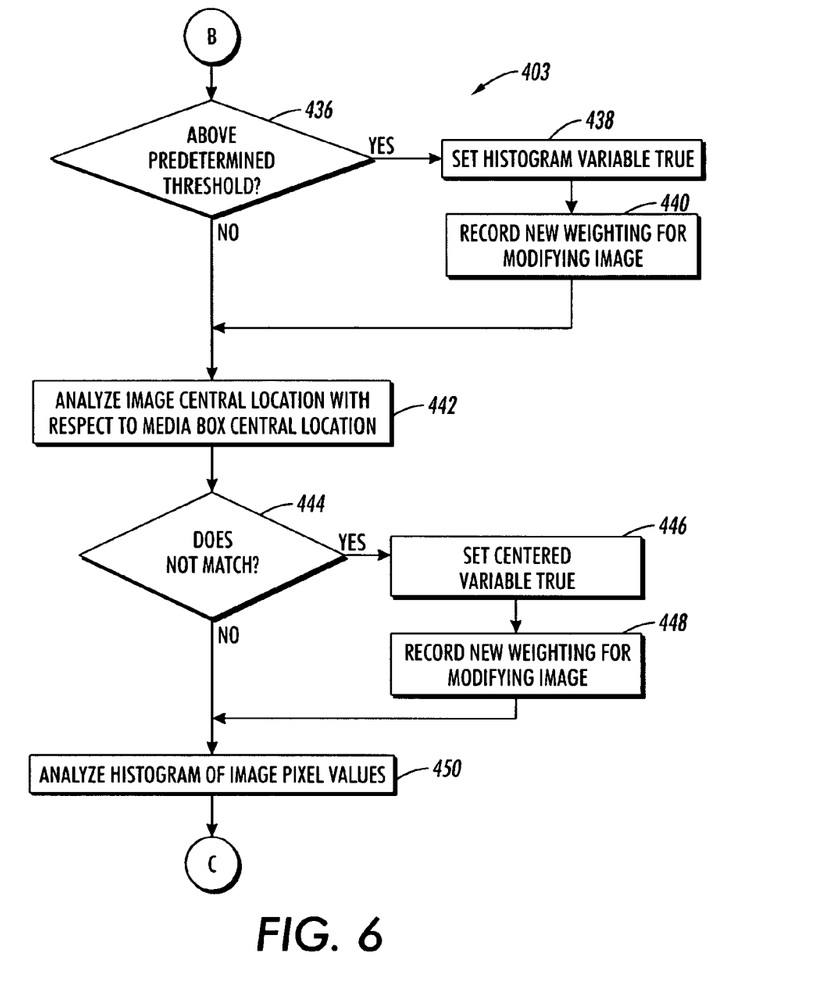
Figure 7:
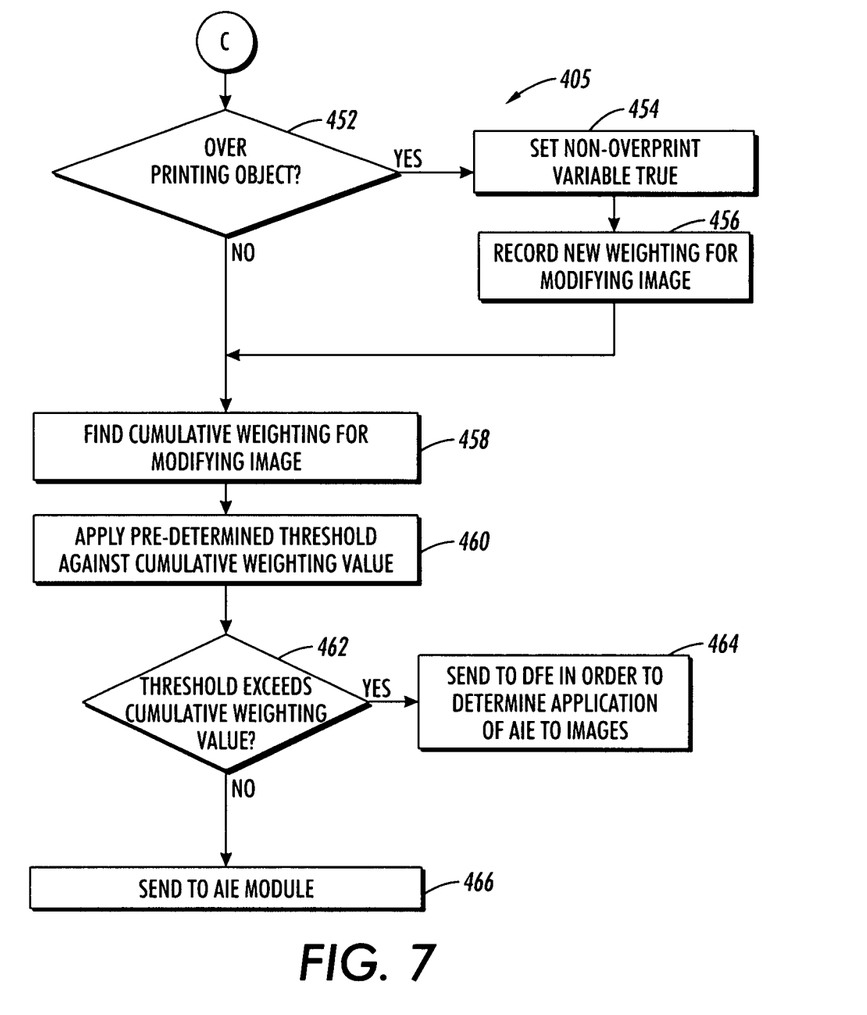

It is important to note that, although the embodiments are described in the context of a fully functional image processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as media storage or CD ROMs and transmission-type media such as analogue or digital communications links. The logical operation steps depicted in FIGS. 3-5 can, for example, be implemented in the context of such a software module.

Figure 1:
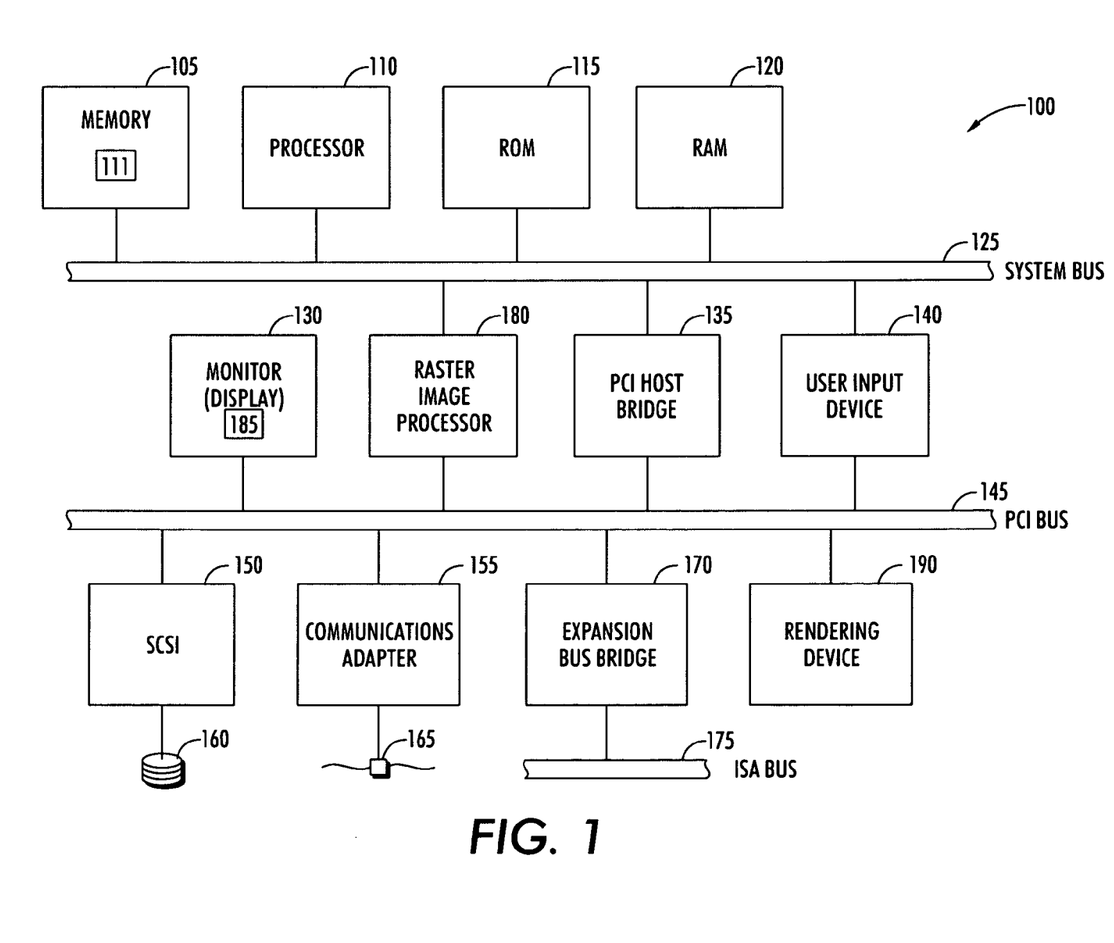
FIG. 1 illustrates a block diagram of a data-processing apparatus, which can be utilized for selective application of AIE (Automatic Image Enhancement), in accordance with a preferred embodiment.

Referring to the drawings and in particular to FIG. 1, there is depicted a data-processing apparatus 100 which can be utilized for retrieving documents based on highlighted text in accordance with a preferred embodiment. Data-processing apparatus 100 represents one of many possible data-processing and/or computing devices, which can be utilized in accordance with the disclosed embodiments. It can be appreciated that data-processing apparatus 100 and its components are presented for generally illustrative purposes only and do not constitute limiting features of the disclosed embodiments.

As depicted in FIG. 1, a memory 105, a processor (CPU) 110, a Read-Only memory (ROM) 115, and a Random-Access Memory (RAM) 120 are generally connected to a system bus 125 of data-processing apparatus 100. Memory 105 can be implemented as a ROM, RAM, a combination thereof, or simply a general memory unit. Module 111 can be stored within memory 105 and then retrieved and processed via processor 110 to perform a particular task. A user input device 140, such as a keyboard, mouse, or another pointing device, can be connected to PCI (Peripheral Component Interconnect) bus 145.

Data-processing apparatus 100 thus includes CPU 110, ROM 115, RAM 120, and a rendering device 190 (e.g., printer, copier, scanner, etc.), which are also coupled to a PCI (Peripheral Component Interconnect) local bus 145 of data-processing apparatus 100 through PCI host-bridge 135. The PCI Host Bridge 135 can provide a low latency path through which processor 110 may directly access PCI devices mapped anywhere within bus memory and/or input/output (I/O) address spaces. PCI Host Bridge 135 also can provide a high bandwidth path for allowing PCI devices to directly access RAM 120.

A communications adapter 155, a small computer system interface (SCSI) 150, a raster image processor (RIP) 180, and an expansion bus-bridge 170 are also attached to PCI local bus 145. The communications adapter 155 can be utilized for connecting data-processing apparatus 100 to a network 165. SCSI 150 can be utilized to control high-speed SCSI disk drive 160. An expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and also for interactively displaying a graphical user interface (GUI) 185.

Note that the term "GUI" generally refers to a type of environment that represents programs, files, options and so forth by means of graphically displayed icons, menus, and dialog boxes on a computer monitor screen. A user can interact with the GUI 185 to select and activate such options by pointing and clicking with a user input device such as, for example, a pointing device such as a mouse, and/or with a keyboard. A particular item can function in the same manner to the user in all applications because the GUI 185 provides standard software routines (e.g., module 111) to handle these elements and reports the user's actions.

The user interface 185 allows for the modification of certain characteristics of a printed image, such as, for example, lightness/darkness, contrast, highlights, shadows, and color cast. In this regard, a user actuates the appropriate keys on the user interface 185 to adjust the parameters of a print job. AIE technology can be applied in the context of a print driver associated with, for example, data-processing apparatus 100, as a prepress service, or within printer software itself. In all cases, the AIE mechanism or software module can analyze the image and, if needed, "brew up" a custom prescription of image processing elements, which are then applied to the image. The rendering device 190 may also require the use of DFE (Digital Front End) data, which can be supplied by an RIP (Raster Image Processor 180, in order to assemble the complete picture, separate the images into the appropriate colors, and send the information to the rendering device 190.

Figure 2:
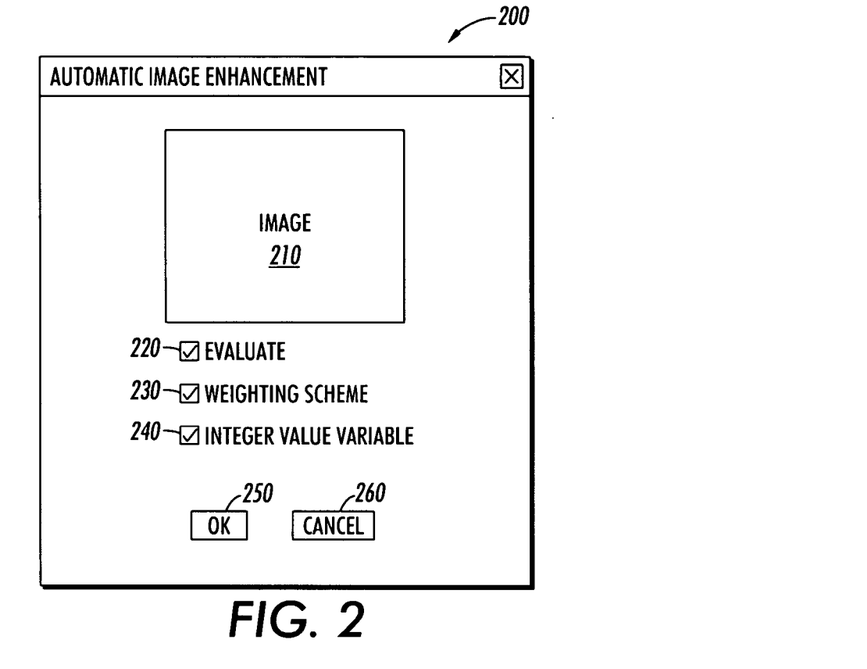
FIG. 2 illustrates an exemplary embodiment of a graphical user interface that permits a user to take particular actions for selective application of AIE, in accordance with a preferred embodiment.

Referring to FIG. 2 an exemplary embodiment of a graphical user interface 200 is disclosed, which permits a user to take particular actions for selective application of AIE, in accordance with a preferred embodiment. Note that GUI window 200 can be implemented utilizing a GUI such as the GUI 185 depicted in FIG. 1 and can be provided by a module, such as, for example, module 111. GUI window 200 can be displayed via a display device such as monitor 130 depicted in FIG. 1 and implemented via the GUI 185. In the example depicted in FIG. 2, the GUI 200 generally contains an image 210.

The illustration depicted in FIG. 2 indicates that different options can be provided for a user by window 200, including graphically displayed input fields 220, 230, and 240, which respectively permit a user to take particular actions for the selective application of AIE to the image 210. The input field 220 permits a user to select an option for providing an evaluate function, while the graphically displayed input field 230 permits a weighting scheme or function to be performed upon the image 210. Additionally, the graphically displayed input field 240 permits a user to select an "integer value variable" option with respect to the image 210. A selection section is also displayed within GUI window 200, which permits a user to select actions by "checking" one or more graphically displayed "click" boxes. By selecting one of these check boxes, a user can select particular actions. Upon a selection the user can move to the next GUI window by clicking an "OK" button 250. Alternatively, the user may simply cancel the present job by "clicking" the graphically displayed "cancel" button 260.

Figure 3:
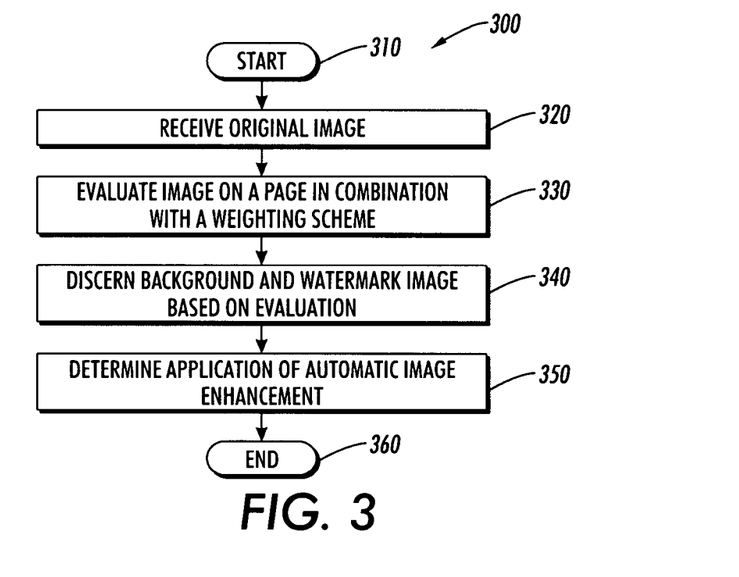
FIG. 3 illustrates a high level flow chart of operations illustrating logical operational steps of a method for the selective application of AIE, in accordance with a preferred embodiment.

FIG. 3 illustrates a high level flow chart of operations illustrating logical operational steps of a method 300 for the selective application of AIE, in accordance with a preferred embodiment. Note that the method 300 depicted in FIG. 3 can be implemented in the context of a software module such as, for example, the module 111 of apparatus 100 depicted in FIG. 1. The process depicted in FIG. 3 can be initiated, as indicated at block 310. Thereafter, as depicted at block 320, an original image can be received. As described next at block 330, an image on a page can be evaluated (e.g., by the selection of input field 220) in combination with a weighting scheme (e.g., via selection of the graphically displayed input field 230). Background and watermark images can be then discerned based on the evaluation, as depicted at block 340. The application of AIE with respect to the image can be thereafter determined, as indicated at block 350. The process can then terminate, as indicated at block 360.

Referring to FIGS. 4-7, a detailed high-level flow chart of operations illustrating logical operational steps of a method 400, 401, 403, 405 for evaluating images on a page in combination with a weighting scheme for application of AIE is illustrated, in accordance with a preferred embodiment. Note that the methods 400, 401, 403, 405 represent varying and continued aspects of the same process. As indicated at block 402, image data can be analyzed. Thereafter, as depicted at block 404, an image residing in a PDF file or format can be analyzed. Next, as shown at block 406, a test can be performed to determine whether the image is designated as background or watermark data. If the image data is designated as background or watermark data as indicated by the operation depicted at block 406, the process control can proceed to processing the operation depicted at block 464 in FIG. 7 as shown at block 408.

Otherwise, the location of the boundaries of the image with respect to other objects printed on same page can be analyzed, as indicated at block 410. Next, as depicted at block 412 an operation can be processed to determine whether the image boundaries overlap other objects, such as text and images, if the image boundaries overlap other objects, the process control continues as indicated thereafter at block 414. Otherwise, the process control jumps directly to the operation depicted at block 418. A boundary value can be set to a "true" value, as depicted at block 414. Then, a new weighting scheme can be recorded for modifying the image, as illustrated at block 416. The process control then continues as indicated at block 418.

The location of the boundaries of the image can be analyzed in relationship to trim box boundaries of the page, as indicated at block 418. Next, as shown at block 420, a test can be performed to determine whether the image is designated as a background or watermark data and/or to determine whether the image boundaries exceed trim box boundaries. If the image boundaries exceed trim box boundaries, the control continues to process the operation depicted at block 422. Otherwise, the control process jumps directly to implement the operation depicted at block 426. A trim box variable can be set to a "true" value, as shown at block 422. Then, a new weighting scheme can be recorded for modifying the image, as illustrated at block 424. The operation depicted at block 426 can then be processed.

An operation can then be performed as indicated at block 426 to analyze the opacity or transparency of the subject image. Next, as depicted at block 428 a test can be performed to determine whether the image is transparent or less than 100% opaque. If the image is transparent or less than 100% opaque, the operation depicted at block 430 can be processed. Otherwise, the operation depicted at block 434 is processed. A transparency variable can be set to a "true" value, as shown at block 430. Then, a new weighting scheme can be recorded for modifying the subject image, as illustrated at block 432. The process then continues as indicated thereafter by the operation depicted at block 434.

The operation illustrated at block 434 involves analyzing a generated histogram of image pixel values associated with the subject image. Such a histogram can be provided as a graph that depicts the number of pixels in an image at different intensity values found in that image. The histogram of image pixel values can be determined by a single valued statistic, such as Median, Minimum, $2^{nd}$ percentile, etc, of the gray levels in each channel or an overall Luminosity value. Next, as illustrated at block 436, a test can be performed to determine whether the image pixel values are above a pre-determined threshold. If the image is above a pre-determined threshold, the process continues to the operation depicted at block 438. Otherwise, the process control jumps directly to the operation illustrated at block 442. A histogram variable can be set to a "true", as shown at block 438. Then, a new weighting scheme can be recorded for modifying the image, as illustrated at block 440.

The process then continues to the operation depicted at block 442, wherein the central location of the subject image with respect to the central location of the media box is analyzed. Next, as shown at block 444 a test can be performed to determine whether the central location of the subject image does not match with the central location of the media box. If the central location of the subject does not match the central location of the media box central location, then the operation depicted at block 450 can be processed. If, however, a match is identified, then the operations described at blocks 446 and 448 are processed. That is, a centered variable can be set to a "true" value, as depicted at block 446. Then a new weighting scheme can be recorded for modifying the subject image, as illustrated at block 448. The process then continues as indicated at block 450.

Overprint variable can be analyzed, as indicated at block 450. Next, as shown in block 452 a test can be made to determine whether the subject image is designated as constituting an overprinting object. If the image is designated as an overprinting object, the process continues as indicated at block 454. Otherwise, the operations proceed directly to implementing the logical operational step depicted at block 458. A non-overprint variable can be set "true", as shown at block 454. Then, a new weighting scheme can be recorded for modifying the subject image, as illustrated at block 456. The process then continues to implement the operation depicted at block 458.

The operation illustrated at block 458 involves searching for identifying the cumulative weighting necessary for modifying the subject image. A pre-determined threshold can be applied against the cumulative weighting value as shown at block 460. Next, as shown at block 462, a test can be performed to determine whether the pre-determined threshold exceeds the cumulative weighting value. If the pre-determined threshold exceeds the cumulative weighting value, the image can be sent to the DFE in order to determine the application of AIE to one or more images, as depicted at block 464. Otherwise, the image can be sent to an AIE module, as illustrated at block 466.

Figure 8:
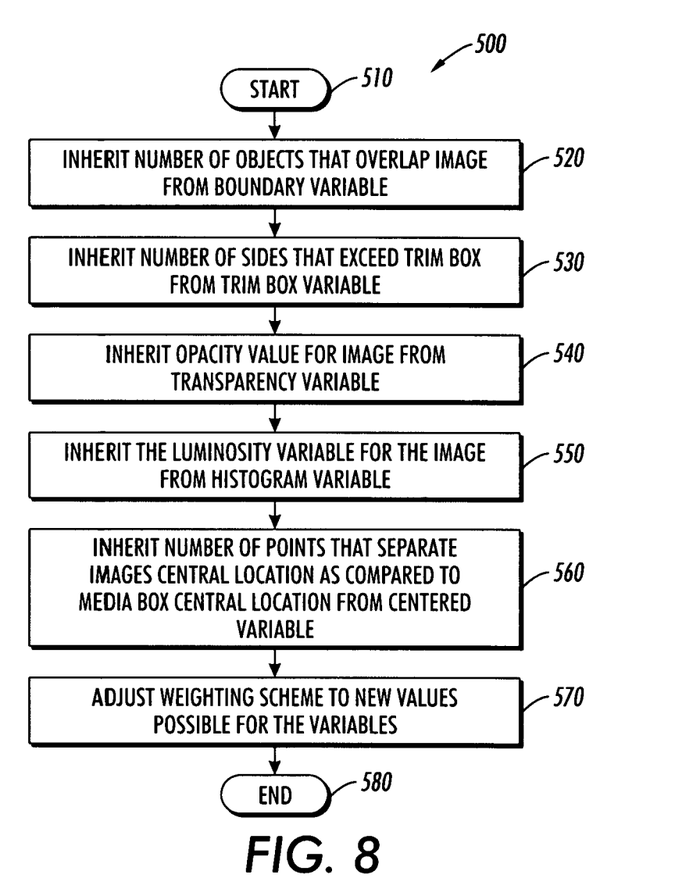
FIG. 8 illustrates a high level flow chart of operations illustrating logical operational steps of a method for inheriting integer value variables, in accordance with a preferred embodiment.

FIG. 8 illustrates a high level flow chart of operations depicting logical operational steps of a method 500 for inheriting integer value variables, in accordance with a preferred embodiment. The process depicted in FIG. 8 can be initiated, as indicated at block 510. The number of objects that overlap the image can be inherited from a boundary variable, as shown at block 520. The number of sides that exceeds a trim box variable can be inherited from the trim box variable, as illustrated at block 530. The opacity value for the image can then be inherited from a transparency variable, as shown at block 540. The luminosity variable for the image can be inherited from a histogram variable, as shown at block 550. The number of points that separate images central location as compared to central location of the media box can additionally be inherited from centered variable, as indicated at block 560. The boundary variable from step 520, the trim box variable from step 530, the transparency variable from step 540, the luminosity variable 550, and the centered variable from step 560, are all combined as a weighting scheme which can be adjusted to new values possible for the variables, as indicated at block 570. The process can then terminate, as indicated at block 580.

Based on the foregoing it can be appreciated that a system can be provided, through the use of one or more software modules as described above, which results in the selective application of automatic image enhancement. The method of selective application described herein addresses many of the problems with traditional enhancement techniques. The main advantage of this method is that it will automatically detect potentially visible background and watermark images on a printed output which prevent AIE from negatively impacting jobs. Time is also saved because there is no need for administration support to manually indicate background or watermark images that should not receive automatic image enhancement.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for the selective application of automatic image enhancements, comprising:
   receiving an original image on a page;
   selecting at least one image from among a plurality of images on said page to be evaluated using a graphical user interface;
   evaluating said at least one image based on at least one characteristic of said at least one image, wherein said at least one image corresponds to a page of data;
   determining if said at least one image comprises at least one visible background image, at least one visible watermark image, or at least one subject image according to said evaluation of said at least one image based on said at least one characteristic of said at least one image; and
   thereafter determining an application or non-application of an automatic image enhancement to said at least one visible background image, said at least one visible watermark image, or said at least one subject image in order to eliminate a need for a user to manually indicate which images should be subject to an automated image enhancement and thereby lower the operational costs associated with processing of said at least one image.

2. The method of claim 1 further comprising:
   analyzing said at least one image with respect to said at least one visible background image, said at least one visible watermark image, or said at least one subject image when said at least one image resides in a PDL data format.

3. The method of claim 1, wherein determining if said at least one image comprises said at least one visible background image, said at least one visible watermark image, or said at least one subject image further comprises:
   establishing a Boolean variable with respect to said at least one characteristic of said at least one image when said at least one image resides in a PDL data format, wherein said Boolean variable is associated with said at least one characteristic.

4. The method of claim 1, wherein determining if said at least one image comprises said at least one visible background image, said at least one visible watermark image, or said at least one subject image further comprises:
   calculating a cumulative weighting value; and
   applying a pre-determined threshold against said cumulative weighting value.

5. The method of claim 4 wherein determining said at least one visible background image further comprises determining if said at least one image extends past at least one perimeter associated with one or more other images; and
   assigning a Boolean value to a boundary value variable, wherein said boundary value variable is used in said cumulative weighting value.

6. The method of claim 4 wherein determining said at least one visible background image further comprises determining if said at least one image comprises at least four edges and whether said at least four edges extend to or past a trim box; and
   assigning a Boolean value to a trim box variable, wherein said trim box variable is used in said cumulative weighting value.

7. The method of claim 4 wherein determining said at least one visible background image further comprises determining if an opacity associated with said at least one image is less than a value of one-hundred percent; and
   assigning a Boolean value to a transparency variable, wherein said transparency variable is used in said cumulative weighting value.

8. The method of claim 4 wherein determining said at least one visible background image further comprises determining a saturation value associated with said at least one image.

9. A method for the selective application of automatic image enhancements, comprising:
- selecting at least one image to be evaluated using a graphical user interface;
- evaluating said at least one image based on said at least one characteristic of said at least one image, wherein said at least one image corresponds to a page of data;
- determining if said at least one image comprises at least one visible background image, at least one visible watermark image, or at least one subject image according to said evaluation of said at least one image based on said at least one characteristic of said at least one image;
- calculating a cumulative weighting value according to said evaluation of said at least one image based on said at least one characteristic of said at least one image;
- applying a pre-determined threshold against said cumulative weighting value in order to determine an application of an automatic image enhancement to said at least one visible background image, said at least one visible watermark image, or said at least one subject image in order to eliminate a need for a user to manually indicate which images should be subject to an automated image enhancement and thereby lower the operational costs associated with processing of said at least one image.

10. The method of claim 9 further comprising:
- analyzing said at least one image with respect to said at least one visible background image, said at least one visible watermark image, or said at least one subject image when said at least one image resides in a PDL data format.

11. The method of claim 9 further comprising:
- establishing a Boolean variable with respect to said at least one image when said at least one image resides in a PDL data format.

12. The method of claim 9 wherein determining if said at least one image comprises said at least one visible background image further comprises determining if said at least one image extends past at least one perimeter associated with said one or more other images; and
- assigning a Boolean value to a boundary value variable, wherein said boundary value variable is used in said cumulative weighting value.

13. The method of claim 9 wherein determining if said at least one image comprises said at least one visible background image further comprises determining if said at least one image comprises at least four edges and whether said at least four edges extend to or past a trim box; and
- assigning a Boolean value to a trim box variable, wherein said trim box variable is used in said cumulative weighting value.

14. The method of claim 9 wherein determining if said at least one image comprises said at least one visible background image further comprises determining if an opacity associated with said at least one image is less than a value of one-hundred percent; and
- assigning a Boolean value to a transparency variable, wherein said transparency variable is used in said cumulative weighting value.

15. A system for the selective application of automatic image enhancements, comprising:
- a data-processing apparatus;
- a module executed by said data-processing apparatus, said module and said data-processing apparatus being operable in combination with one another to:
  - receive at least one image to be evaluated using a graphical user interface;
  - evaluate said at least one image based on said at least one characteristic of said at least one image, wherein said at least one image corresponds to a page of data;
  - determine if said at least one image comprises at least one visible background image, at least one visible watermark, or at least one subject image according to said evaluation of said at least one image based on said at least one characteristic of said at least one image; and
  - thereafter determine an application or non-application of an automatic image enhancement to said at least one visible background image, said at least one visible watermark image, or said at least one subject image in order to eliminate a need for a user to manually indicate which images should be subject to an automated image enhancement and thereby lower the operational costs associated with processing of said at least one image.

16. The system of claim 15 wherein said module and said data-processing apparatus are further operable in combination with one another to analyze said at least one image with respect to said at least one visible background image, said at least one visible watermark image, or said at least one subject image when said at least one image resides in a PDL data format.

17. The system of claim 15 wherein said module and said data-processing apparatus are further operable in combination with one another to establish a Boolean variable with respect to said at least one characteristic of said at least one image when said at least one image resides in a PDL data format, wherein said Boolean variable is associated with said at least one characteristic.

18. The system of claim 15 wherein said module and said data-processing apparatus are further operable in combination with one another to:
- calculate a cumulative weighting value; and
- apply a pre-determined threshold against said cumulative weighting value in order to determine if said at least one image is sent to a digital front end or to an automatic image enhancement module 19. The system of claim 15 wherein said module and said data-processing apparatus are further operable in combination with one another to:
- determine if said at least one image extends past at least one perimeter associated with said one or more other images; and
- assign a Boolean value to a boundary value variable, wherein said boundary value variable is used in said cumulative weighting value.

* * * * *